(12) United States Patent
Sun et al.

(10) Patent No.: US 9,580,163 B2
(45) Date of Patent: Feb. 28, 2017

(54) BENDING-SUSTAINING JOINT AND AIRCRAFT

(71) Applicant: AIRBUS S.A.S., Blagnac (FR)

(72) Inventors: Wei Sun, Beijing (CN); Hong Chen, Beijing (CN)

(73) Assignee: AIRBUS S.A.S., Blagnac (FR)

( * ) Notice: Subject to any disclaimer, the term of this patent is extended or adjusted under 35 U.S.C. 154(b) by 395 days.

(21) Appl. No.: 14/529,404

(22) Filed: Oct. 31, 2014

(65) Prior Publication Data

US 2015/0329193 A1    Nov. 19, 2015

(30) Foreign Application Priority Data

Nov. 1, 2013    (CN) .......................... 2013 1 0535527

(51) Int. Cl.
*B64C 1/06* (2006.01)
*B64C 9/02* (2006.01)
*F16C 11/02* (2006.01)

(52) U.S. Cl.
CPC ................ *B64C 1/069* (2013.01); *B64C 9/02* (2013.01); *F16C 11/02* (2013.01)

(58) Field of Classification Search
CPC .............................. B64C 1/069; F16B 5/0258
USPC ......................................... 411/424, 383, 122
See application file for complete search history.

(56) References Cited

U.S. PATENT DOCUMENTS

| 184,888 | A | 11/1876 | Munzinger |
| 3,468,570 | A | 9/1969 | Mielke |
| 4,435,100 | A | 3/1984 | Cox |
| 4,889,458 | A | 12/1989 | Taylor |
| 5,947,625 | A | 9/1999 | Vauchel |
| 7,857,563 | B2 * | 12/2010 | Pratt .................... F16B 19/1054 411/34 |
| 2008/0042007 | A1 | 2/2008 | Machado |
| 2009/0116777 | A1 | 5/2009 | Blades et al. |
| 2010/0032520 | A1 | 2/2010 | Mauran et al. |

FOREIGN PATENT DOCUMENTS

| EP | 0309129 A1 | 3/1989 |
| GB | 2019483 A | 10/1979 |

OTHER PUBLICATIONS

European Search Report for EP Application No. 14190937.4 mailed Apr. 28, 2015.

* cited by examiner

*Primary Examiner* — Philip J Bonzell
*Assistant Examiner* — Michael Kreiner
(74) *Attorney, Agent, or Firm* — Hauptman Ham, LLP (57) ABSTRACT

The present invention relates to a bending-sustaining joint and an aircraft including the same. The bending-sustaining joint includes a body for attaching to a support structure, the body having a first end with a first bore including an internal thread portion and a non-threaded portion; a sleeve including a fitting portion which can be fit into the non-threaded portion of the first bore, a bearing portion for bearing a born member and a through hole; and a bolt member including a thread section and a bolt head which can abut an end face of the sleeve, the thread section of the bolt member being capable of passing through the through hole of the sleeve and being screwed into the internal thread portion of the first bore so as to secure the sleeve to the body.

18 Claims, 13 Drawing Sheets

BENDING-SUSTAINING JOINT AND AIRCRAFT

RELATED APPLICATIONS

The present application claims priority from Chinese Application Number 201310535527.X, filed, Nov. 1, 2013, the disclosure of which is hereby incorporated by reference herein in its entirety.

FIELD OF THE INVENTION

The invention relates to a bending-sustaining joint and an aircraft.

BACKGROUND OF THE INVENTION

The contents in this section only provide background information relating to the present invention which does not necessarily constitute the prior art.

A joint adopting thread to achieve connection is widely used in the engineering due to the convenient installation thereof. This joint having thread (also referred to as thread joint hereinafter) is usually used to sustain an axial load. When a radial load or torque is applied on this thread joint, the thread on the joint is apt to be damaged which will lead to failure of the whole thread joint.

Especially in the field of the aircraft, the thread joint is frequently used to connect two control airfoils which need synchronous movement. For example, when the control airfoil is a spoiler, the spoiler will apply the radial load to the thread joint during the movement and thus it will decrease the reliability of the thread joint and even break the thread joint. On the other hand, when two spoilers are to be connected with each other by the thread joint, the thread joint can usually installed from one side which decreases the assemblability of the thread joint. Moreover, for such application area as aircraft which requires high safety and assembly accuracy, the thread joint still need improvement.

SUMMARY OF THE INVENTION

One object of the present invention is to provide a joint which can sustain the radial load (also referred to as bending-sustaining joint hereinafter).

Another object of the present invention is to provide a bending-sustaining joint which can assembly easily.

Still another object of the present invention is to provide a bending-sustaining joint whose safety and assembly accuracy are improved.

One or more of the above objects can be achieved by a bending-sustaining joint including a body for attaching to a support structure, the body having a first end with a first bore including an internal thread portion and a non-threaded portion; a sleeve including a fitting portion which can be fit into the non-threaded portion of the first bore, a bearing portion for bearing a borne member and a through hole; and a bolt member including a thread section and a bolt head which can abut an end face of the sleeve, the thread section of the bolt member being capable of passing through the through hole of the sleeve and being screwed into the internal thread portion of the first bore so as to secure the sleeve to the body.

In the above technical solution, since the borne member is borne on the bearing portion of the sleeve, and the sleeve is securely fastened to the body through the bolt member and the cooperation between the fitting portion of the sleeve and the non-threaded portion of the body attached to the support structure, the radial load (or the radial component of the load) applied on the sleeve by the borne member is directly transferred to the body via the cooperation between the fitting portion of the sleeve and the non-threaded portion of the body. In other words, in the bending-sustaining joint of the present invention, the sleeve and the body sustain the radial load while the thread of the bolt member only sustains the axial load (that is, the axial force for securing the sleeve to the body in the axial direction). Therefore, the bending-sustaining joint of the present invention can sustain the radial load without any risk for damaging the thread.

Preferably, the sleeve may further includes an external thread portion, and the bending-sustaining joint may further include a fastening assembly for fitting on the external thread portion of the sleeve so as to hold the borne member between the fastening assembly and an end face of the first end of the body. Therefore, the borne member is reliably hold on the sleeve (i.e. the bending-sustaining joint).

Preferably, the fitting portion of the sleeve may be positively fit into the non-threaded portion of the first bore of the body. Here, "positively fit" means shape fit, that is, the fitting portion of the sleeve and the non-threaded portion of the first bore of the body have matched cross section shape, preferably non-circular cross section shape such as ellipse, quadrangle, hexagon, dodecagon, or they can be spline fit. Therefore, the radial load can be reliably transferred between the fitting portion of the sleeve and the non-threaded portion of the first bore of the body and the sleeve can be prevented from rotating relative to the body.

Preferably, the fitting portion of the sleeve may have a flat portion, and the non-threaded portion of the first bore of the body may have a matched flat portion. More preferably, the flat portion of the fitting portion of the sleeve may be substantially perpendicular to a radial component of a load applied on the bearing portion of the sleeve by the borne member. Since the load between the sleeve and the body is transferred by the flat portion having relatively larger area, the partial failure can be avoided. In addition, since the load is perpendicular to the flat portion, the flat portion can effectively sustain the load and can sustain more load.

Preferably, there may be a predetermined radial gap between the sleeve and the bolt member. Therefore, even if the sleeve is radially deformed by the radial load, the sleeve will not transfer the radial load to the bolt member, thereby avoiding the thread of the bolt member from sustaining the radial load.

Preferably, an adjustment washer is provided between the borne member and the first end of the body. By use of the adjustment washer having different size, the manufacturing error and/or the assembling error of the components can be effectively compensated. Therefore, the requirements for the manufacturing accuracy of the components can be decreased and the whole manufacturing cost of the bending-sustaining joint can be decreased.

Preferably, a lock plate may be provided between the bolt head of the bolt member and the end face of the sleeve, and the bolt head is locked relative to the sleeve via the lock plate. By use of the above lock means, the bolt member will not be loosen due to the movement, vibration of the components, thereby ensuring the reliability and the safety of the connection.

Preferably, the lock plate may be locked to the sleeve via a first lock mechanism, and the bolt head may be locked to the lock plate via a second lock mechanism. More preferably, the first lock mechanism may include a protrusion/recess provided on the lock plate and a recess/protrusion accordingly provided on the sleeve. More preferably, the second lock mechanism may include a first lock hole provided on the bolt head, a second lock hole provided on the lock plate and a wire member passing through the first lock hole and the second lock hole. The above lock mechanisms have simple configuration and at the same time ensure the reliable safe locking among the bolt member, the sleeve and the body, which further decreases the cost of the bending-sustaining joint and improves the reliability and the safety of the bending-sustaining joint.

Preferably, the fastening assembly may include a lock nut and a lock washer. More preferably, the lock washer may include a first tab which can be fit in a groove formed on an outer circumference of the sleeve and a second tab which can be fit in a groove formed on an outer circumference of the lock nut. The fastening assembly can reliably hold the borne member on the bending-sustaining joint and can be prevented from loosening accidentally.

Preferably, the sleeve may include a step portion for abutting against an end face of the first end of the body. By the step portion, the dimensions of the sections of the sleeve on both sides of the step portion can be defined accurately, and thus high accuracy of the assembly can be achieved easily.

Preferably, the body may have a second end with a second bore, the second bore may have the symmetrical configuration as that of the first bore, and the second end of the body is provided with a second sleeve, a second bolt member and a second fastening assembly which have the same configuration as that of the sleeve, the bolt member and the fastening assembly, respectively. With the above configuration, two borne member can be easily installed from both sides of the bending-sustaining joint, respectively, and then be fastened by the fastening assembly. Therefore, the assembling process of the control airfoil such as the spoiler can be optimized and facilitated.

Preferably, the body may be attached to the support structure by one of the following manner that: i) a flange member integrally formed on the body abuts against a first side of the support structure, and a fastening assembly fit on an external thread portion on an outer circumference of the body abuts against a second side of the support structure; and ii) two fastening assembly fit on an external thread portion on an outer circumference of the body abut against a first side and a second side of the support structure, respectively. Therefore, the body and the whole bending-sustaining joint can be attached to the support structure more reliably and conveniently.

Preferably, the support structure may be a bracket formed in a wing of an aircraft, and the borne member may be a link member for attaching to a control airfoil of the aircraft. More preferably, the control airfoil may include a flap, a slat and a spoiler. Therefore, the bending-sustaining joint of the present invention can be widely applied to the aircraft field.

Preferably, the present invention also relates to an aircraft including the above bending-sustaining joint.

BRIEF DESCRIPTION OF THE DRAWINGS

Features and advantages of one or more embodiments of the present invention can be understood more readily with reference to the description in conjunction with the drawings in which.

DETAILED DESCRIPTION

The following description of the preferred embodiments is only illustrative rather than a limitation to the present invention and application or usage thereof. Throughout the figures, the like reference signs are used to indicate the like elements and thus the description of the like elements will be repeated.

First of all, the application situation of the bending-sustaining joint of the present invention will be described with reference to FIGS. 1-5. In the aircraft field, the control airfoils such as a flap, a slat and a spoiler usually need to be connected by a joint to achieve synchronous movement, for example, rotation. In FIGS. 1-5, the application of the bending-sustaining joint 100 is described by taking the spoiler 1, 2 for example. However, those skilled in the art should understand that the present invention is not limited thereto, instead, the bending-sustaining joint of the present invention may be applied to any application that will sustain the radial load.

Figure 1:
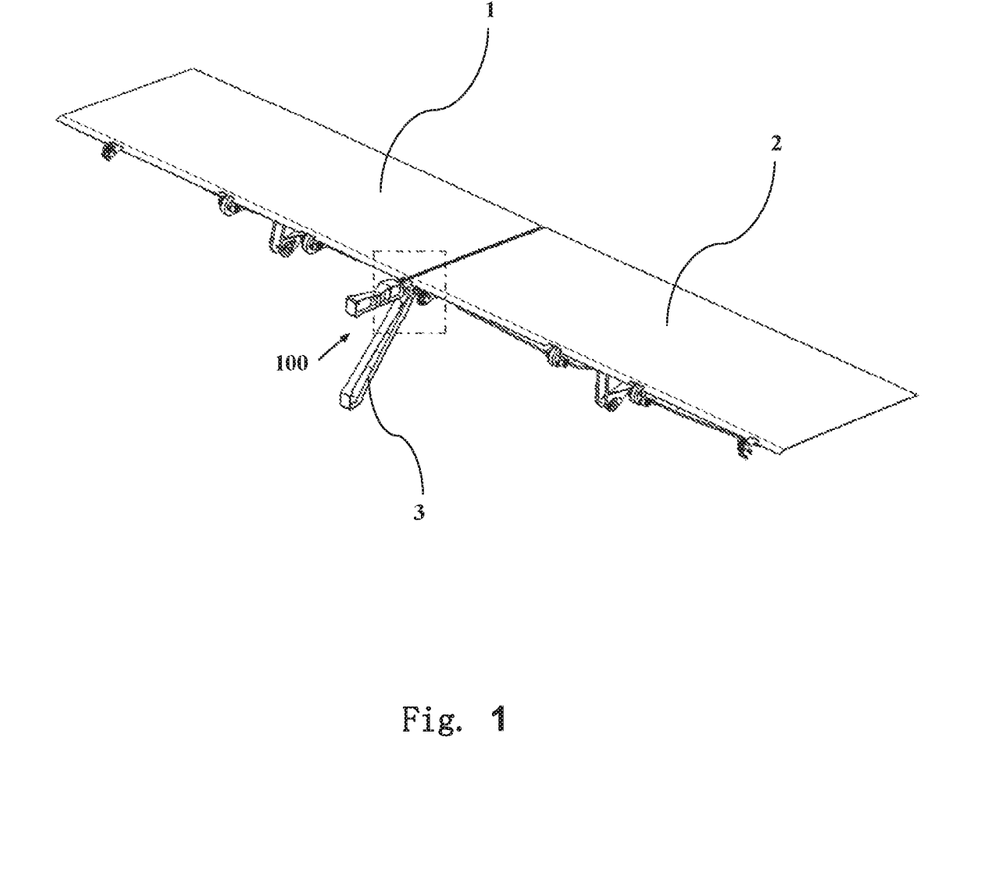
FIG. 1 is a perspective view of two spoilers connected by the bending-sustaining joint according to an embodiment of the present invention.
Figure 2:
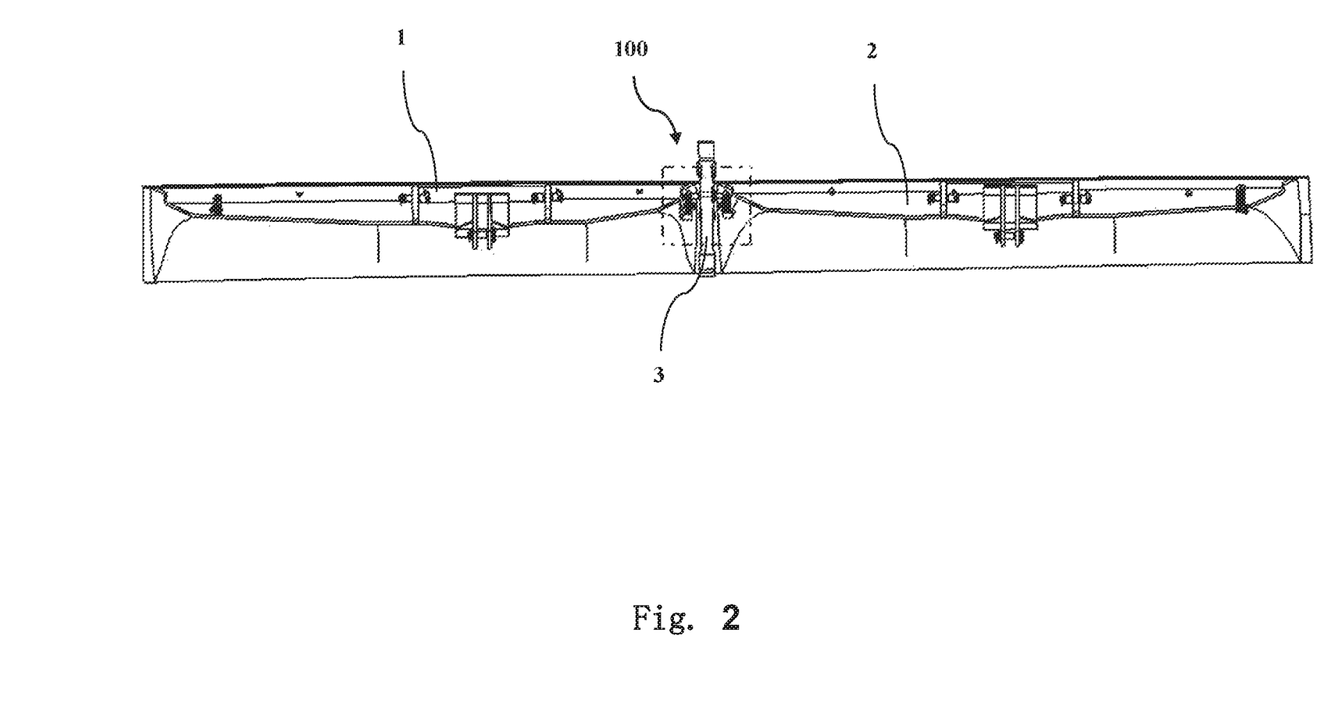
FIG. 2 is a bottom view of the components shown in FIG. 1.
Figure 3:
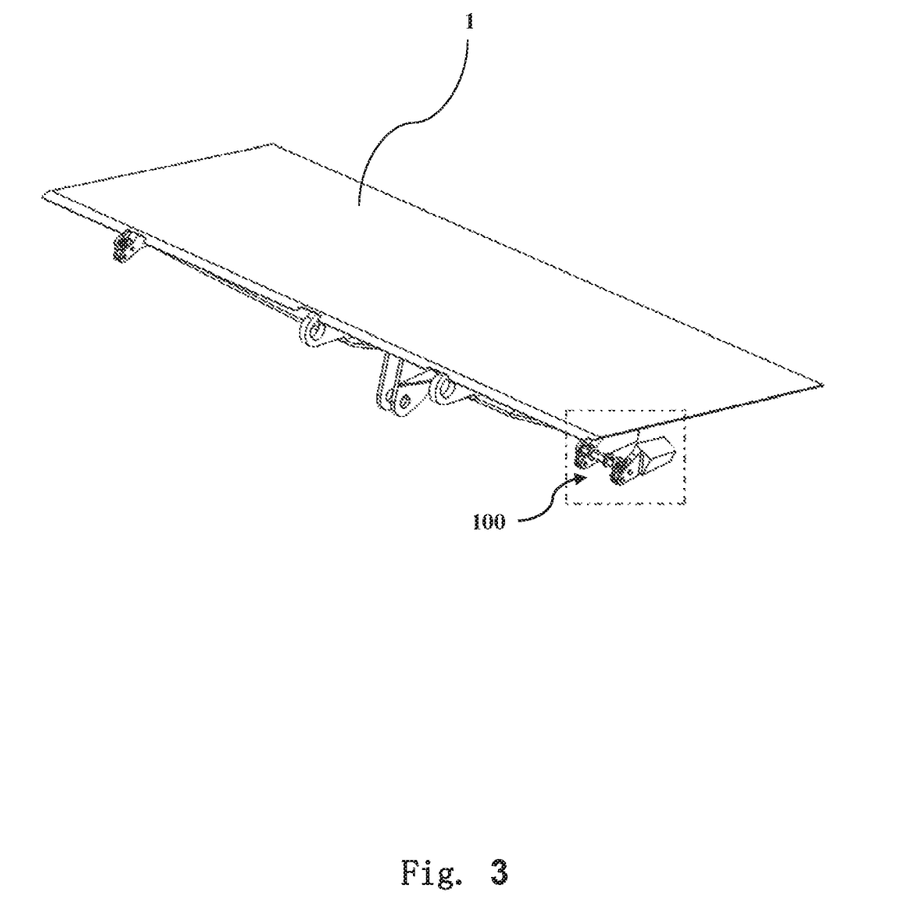
FIG. 3 is a view similar to FIG. 1 in which one spoiler is removed.
Figure 4:
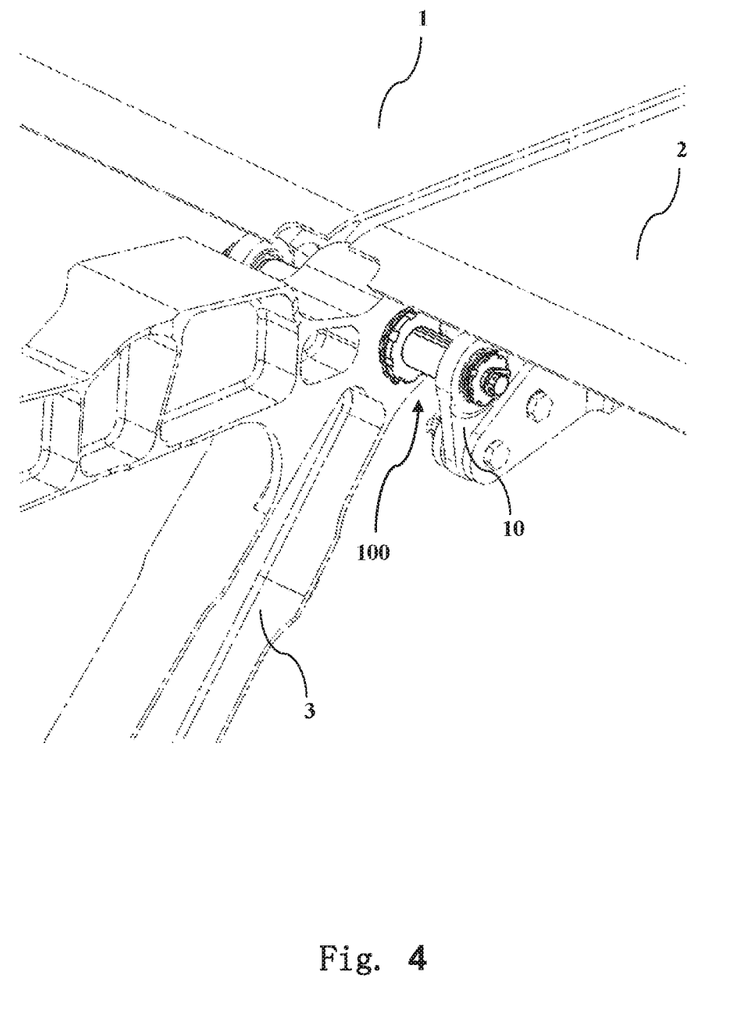
FIG. 4 is a partially enlarged view of FIG. 1.
Figure 5:
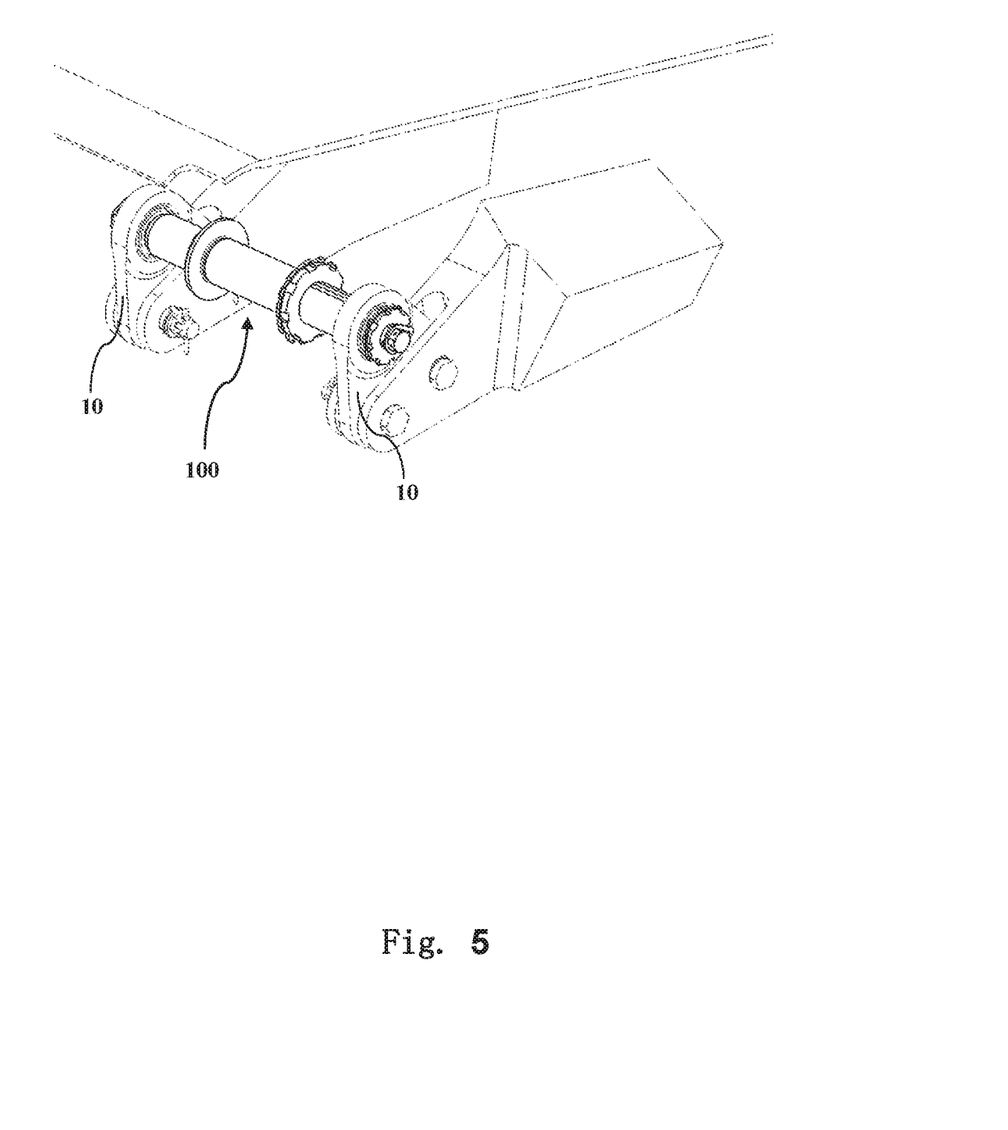
FIG. 5 is a view similar to FIG. 4 in which one spoiler is removed.
Figure 6:
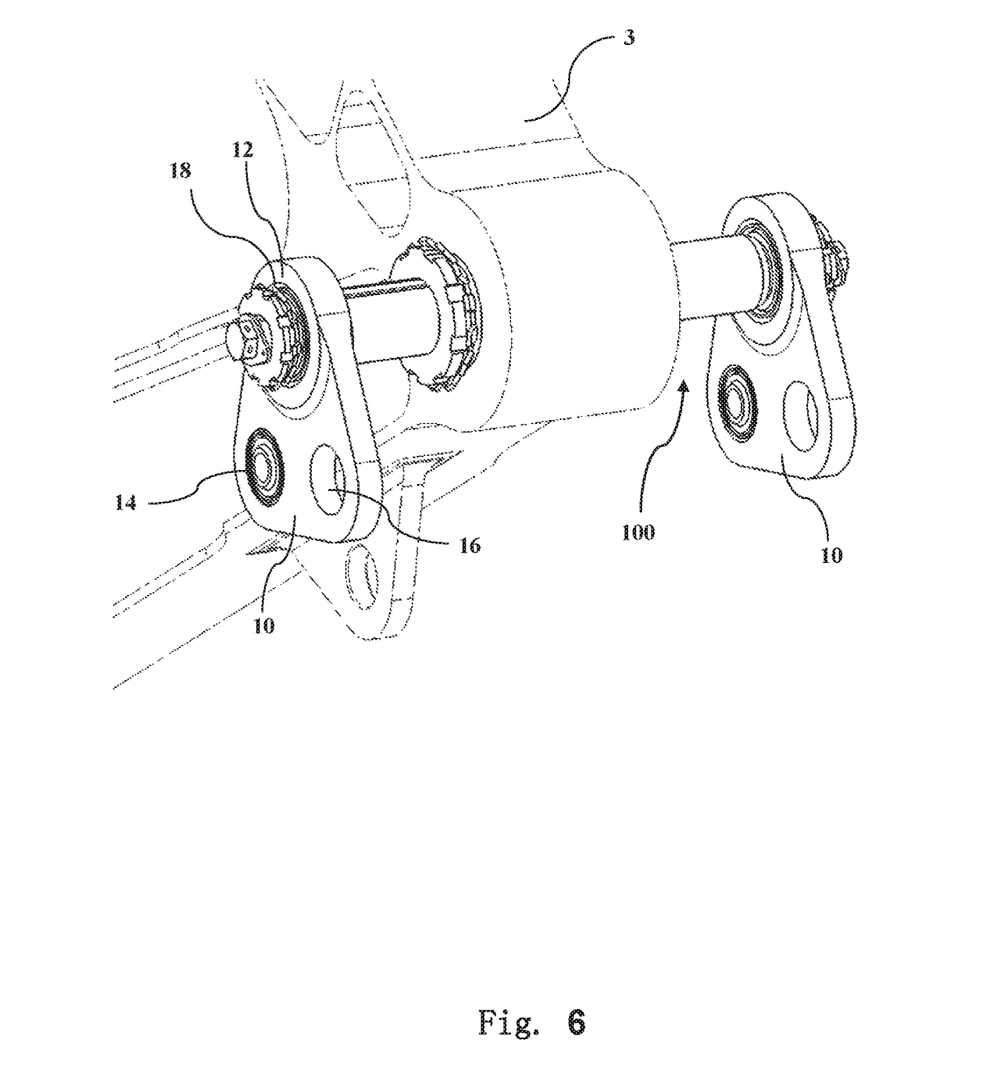
FIG. 6 is a schematic view in which the link member of the spoiler is assembled on the bending-sustaining joint according to an embodiment of the present invention.
Figure 7:
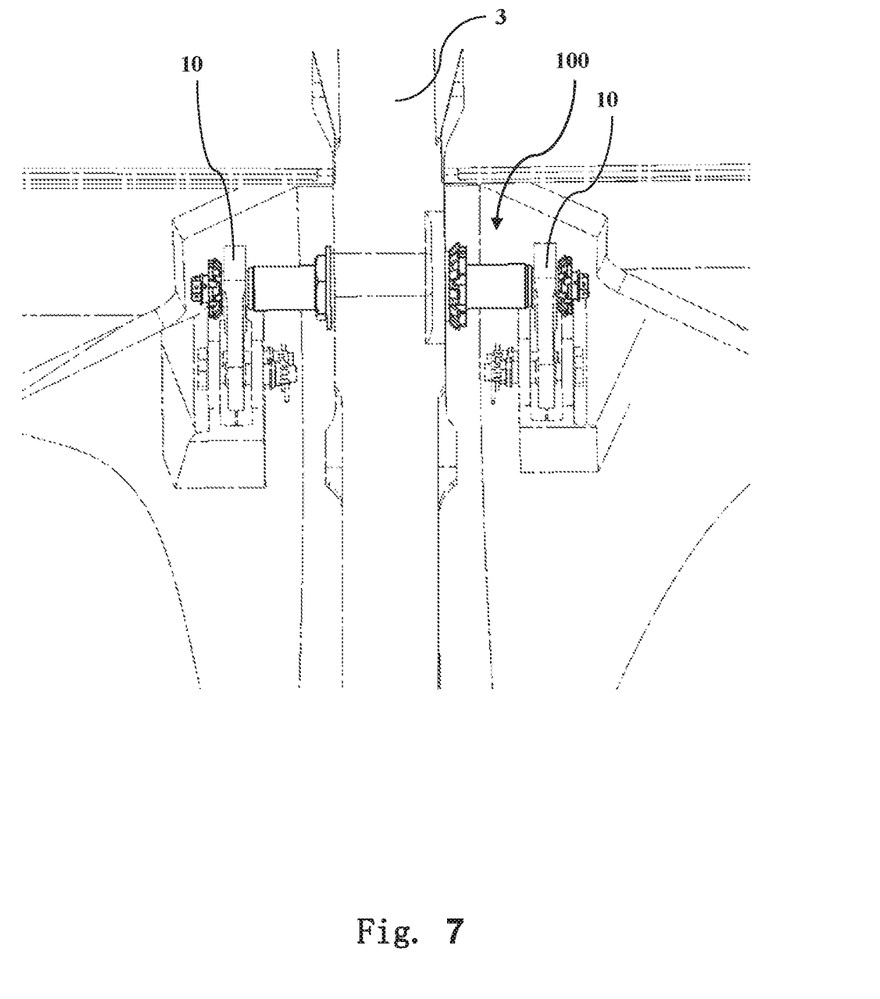
FIG. 7 is a bottom view of the components shown in FIG. 6.

As shown in FIGS. 1-5, the spoiler 1, 2 are connected by the bending-sustaining joint 100 and supported on the support structure 3 such as a bracket of the aircraft such that an actuator (not shown) can drive the spoiler 1, 2 to rotate synchronously around the bending-sustaining joint 100. Usually, the spoiler 1, 2 may be attached to the bending-sustaining joint 100 via the respective link member 10. As shown in FIG. 6, the link member 10 may include a connection hole 12 for fitting on the bending-sustaining joint 100 and a connection hole 14 and/or a connection hole 16 connected to the spoiler or the other connection structure of the spoiler. In a preferable embodiment, a bearing device 18 such as a ball bearing is provided in the connection hole 12. The inner race of the bearing device 18 is fit on the bearing portion 134 of the sleeve 130 of the bending-sustaining joint 100 which will be described later, while the outer race of the bearing device 18 is fit in the connection hole 12. In this case, the link member 10 can be rotated around the bending-sustaining joint 100 (more accurately, the sleeve 130). Those skilled in the art should understand that the configuration and shape of the link member 10 are not limited thereto, instead can be appropriately determined according to the actual application. It should be noted that the link member 10 may correspond to the borne member in the claims.

The specific configuration of the bending-sustaining joint 100 will be described below with reference to FIGS. 6-14.

Figure 8:
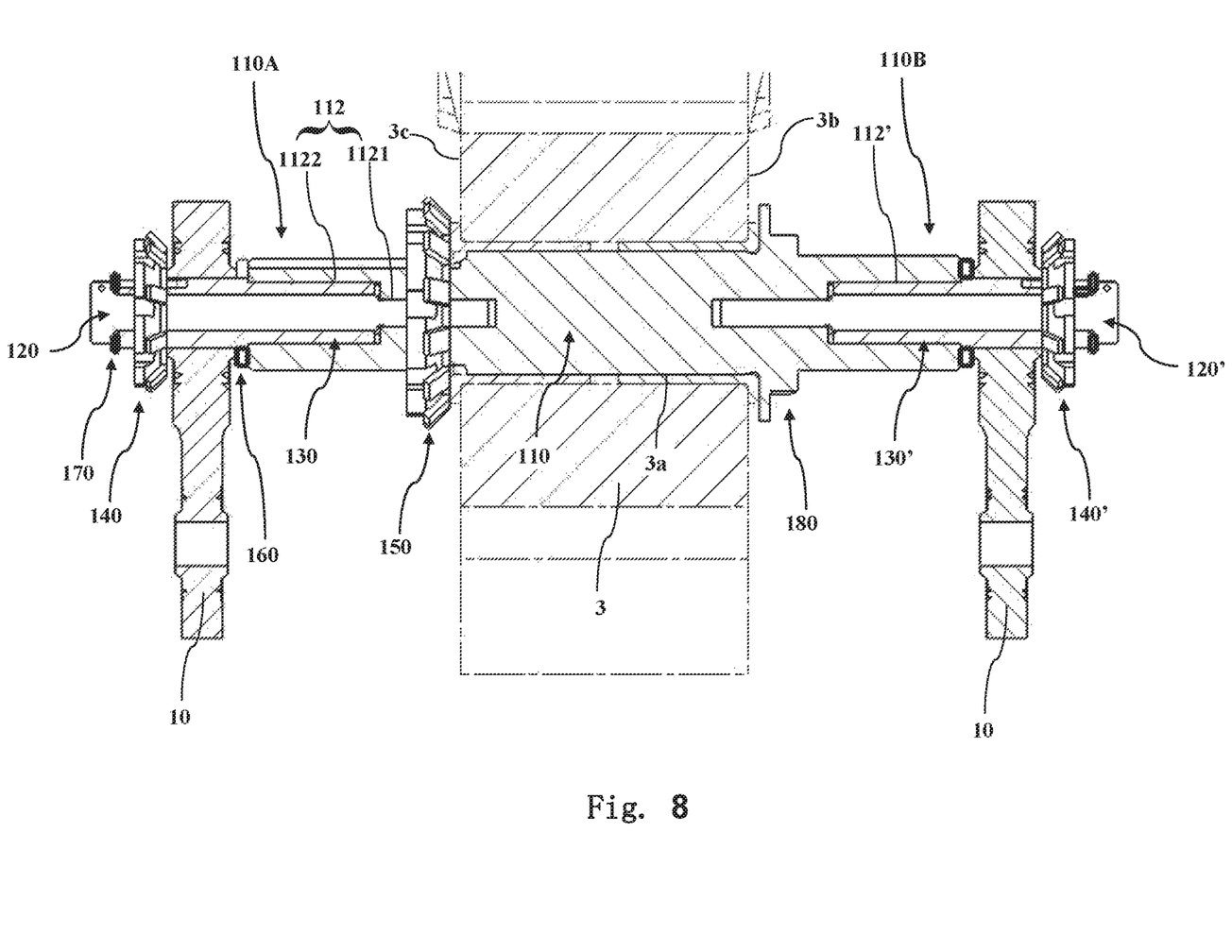
FIG. 8 is a section view in which the link member of the spoiler is assembled on the bending-sustaining joint according to an embodiment of the present invention.
Figure 11:
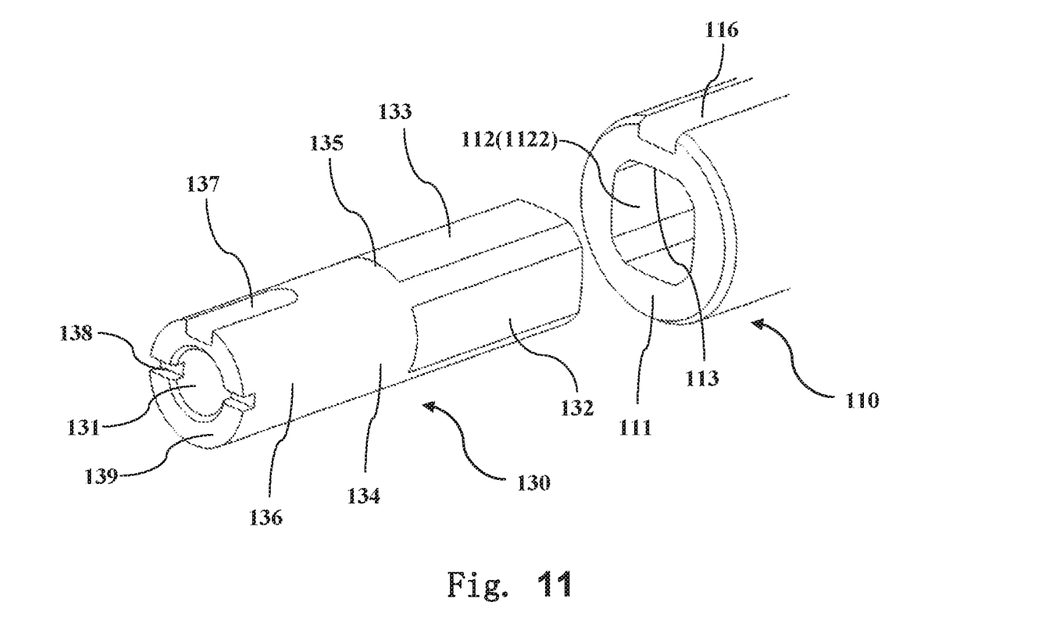
FIG. 11 is a partially perspective view of the sleeve and the body.
Figure 12:
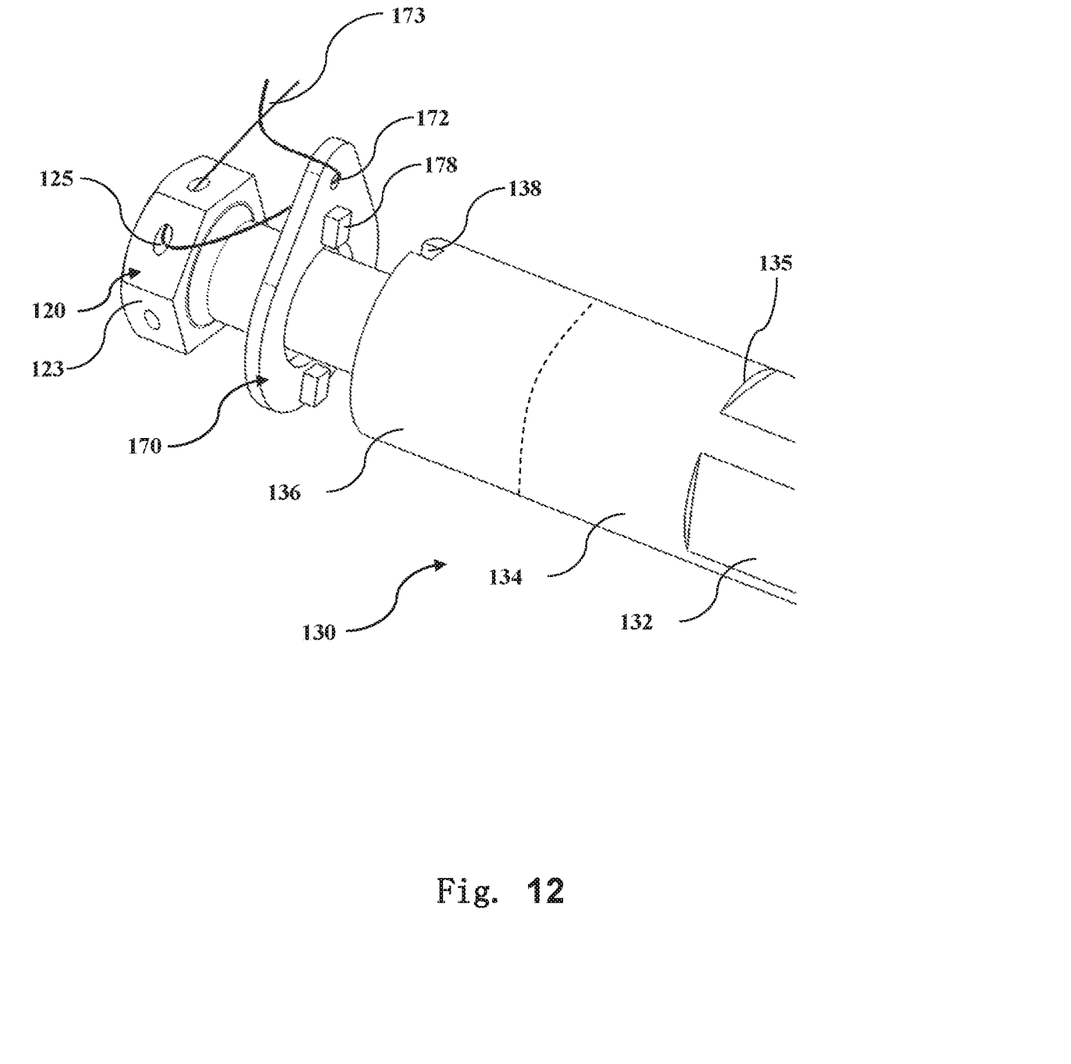
FIG. 12 shows the locking configuration among the bolt member, the lock plate and the sleeve.
Figure 13:
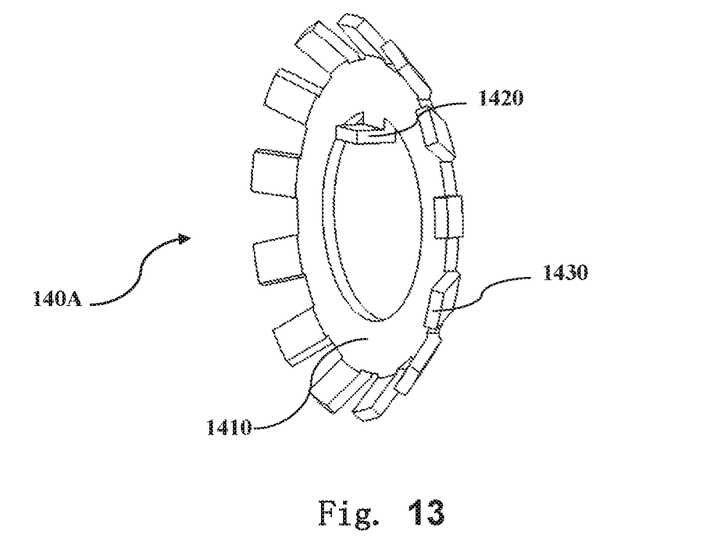
FIG. 13 is a perspective view of the lock washer.
Figure 14:
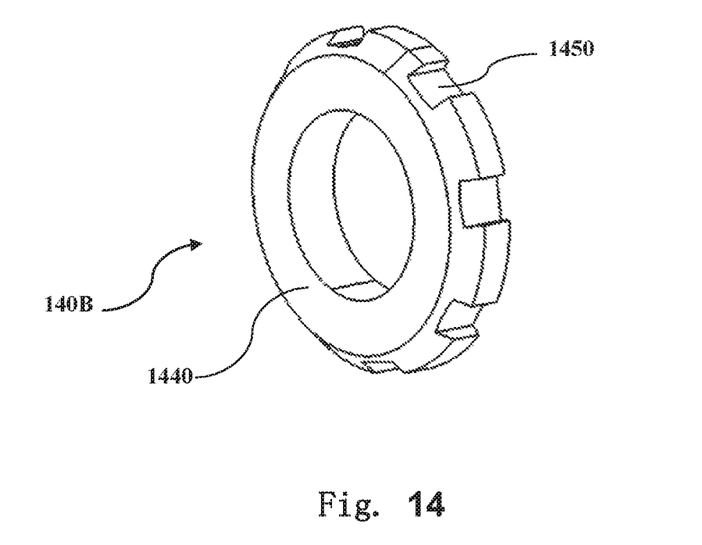
FIG. 14 is a perspective view of the lock nut.

The bending-sustaining joint 100 according to one embodiment of the present invention is formed into a split configuration, and includes a body 110 for attaching to the support structure 3. The body 110 may be substantially a cylinder, column or the other shape. In the example shown in the figures, the body 110 may pass through a through hole 3a formed in the support structure 3 and fixed relative to the support structure 3 by suitable fastening means. For example, as shown in FIG. 8, the body 110 may be attached to the support structure 3 by the following manner that a flange member 180 integrally formed on the body 110 abuts against a first side 3b of the support structure 3, and a fastening assembly 150 fit on an external thread portion 114 on an outer circumference of the body 110 abuts against a second side 3c of the support structure 3. For example, the fastening assembly 150 may include a lock nut 140B as shown in FIG. 12 and a lock washer 140A as shown in FIG. 11. Specifically, the lock washer 140A may include a general annular base 1410, one or more first tab 1420 inwardly radially protruded from the base 1410, and one or more second tab 1430 outwardly radially protruded from the base 1410. The lock nut 140B may include a general annular base 1440, the inner circumference of which is formed with the thread, and the outer circumference of which is formed with a plurality of groove 1450. In a preferable configuration, the plurality of groove 1450 may be equidistantly spaced from each other in the circumferential direction. During the installation, the first tab 1420 of the lock washer 140A may be fit in the groove 116 of the body 110 to prevent the lock washer 140A from circumferentially rotating relative to the body 110, and then the lock nut 140B may be screwed onto the external thread portion 114 on the outer circumference of the body 110. When the lock nut 140B is screwed to a predetermined fastening force, the second tab 1420 of the lock washer 140A may be bent to fit in the groove 1450 of the lock nut 140B in order to prevent the lock nut 140B from circumferentially rotating relative to the lock washer 140A. Therefore, the lock nut 140B is prevented from circumferentially rotating relative to the body 110, thereby achieve the firm securing therebetween.

Those skilled in the art should understand that two fastening assemblies 150 may be used to secure the body 110 from both sides of the support structure 3. For example, the sections of the outer circumference of the body 110 at both sides of the support structure 3 may be provided with the external thread portion 114, two fastening assembly 150 are screwed onto the external thread portion 114 to abut against the first side 3b and the second side 3c of the support structure 3, respectively.

The body 110 may further include a first end 110A with a first bore 112 and a second end 110B with a second bore 112'. In the example shown in the figures, since the first end 110A and the second end 110B of the body 110 have the same or symmetrical configuration, and the sleeve 130, 130', the bolt member 120, 120' and the fastening assembly 140, 140' which have the same configuration are provided on the first end 110A and the second end 110B of the body 110, respectively, the following description of the embodiment of the present invention is only made by taking the configuration of the first end 110A of the body 110 as an example.

Specifically, the first bore 112 of the first end 110A of the body 110 may include an internal thread portion 1121 and a non-threaded portion 1122. The sleeve 130 may include a fitting portion 132 which can be fit into the non-threaded portion 1122 of the first bore 112 and a bearing portion 134 for bearing the link member (the borne member) 10. The sleeve 130 may include a through hole 131. The bolt member 120 may include a thread section 121 and a bolt head 123 which can abut an end face of the sleeve 130. The thread section 121 of the bolt member 120 is capable of passing through the through hole 131 of the sleeve 130 and being screwed into the internal thread portion 1121 of the first bore 112 of the body 110 so as to secure the sleeve 130 to the body 110.

Further, the sleeve 130 may include an external thread portion 136. The external thread portion 136 is formed on the outer side of the bearing portion 134, that is, the bearing portion 134 is located between the external thread portion 136 and the fitting portion 132. The fastening assembly 140 can be fit on the external thread portion 136 of the sleeve 130 so as to hold the link member 10 between the fastening assembly 140 and an end face 111 of the first end 110A of the body 110. The fastening assembly 140 may have the same configuration as that of the fastening assembly 150, that is, the fastening assembly 140 may also include a lock nut 140B as shown in FIG. 12 and a lock washer 140A as shown in FIG. 11. During the installation, the first tab 1420 of the lock washer 140A may be fit in the groove 137 (see FIG. 11) formed on the outer circumference of the sleeve 130 to prevent the lock washer 140A from circumferentially rotating relative to the sleeve 130, while the lock nut 140B may be screwed onto the external thread portion 136 on the outer circumference of the sleeve 130, thereby preventing the fastening assembly 140 from loosening relative to the sleeve 130 accidentally.

Preferably, the fitting portion 132 of the sleeve 130 is positively fit (shape fit) into the non-threaded portion 1122 of the first bore 112 of the body 110. More preferably, the fitting portion 132 of the sleeve 130 may have one or more flat portion 133, correspondingly, the non-threaded portion 1122 of the first bore 112 of the body 110 may have a matched flat portion 113. The flat portion 133 or 113 can be orientated such that the flat portion 133 or 113 is substantially perpendicular to a radial component of a load applied on the bearing portion 134 of the sleeve 130 by the link member 10. Whereby, the sleeve 130 can transfer the radial load to the body more reliably and can transfer more radial load without partial failure.

Preferably, there may be a predetermined radial gap t (see FIG. 10) between the sleeve 130 and the bolt member 120. Specifically, the inner diameter of the through hole 131 of the sleeve 130 is larger than the outer diameter of the shank 122 of the bolt member 120. It should be noted that the shank 122 may have thread or have no thread. Therefore, even if the sleeve 130 is radially deformed by the radial load, the deformation (i.e. radial load) of the sleeve 130 will be not transferred to the bolt member 120 owing to the radial gap, thereby ensuring that the bolt member 120 only sustain the axial force but not sustain the radial force.

As an error adjusting means, a step portion 135 for abutting against an end face 111 of the first end 110A of the body 110 may be provided on the outer circumference of the sleeve 130. By the step portion 135, the dimensions the sections of the sleeve 130 on both sides of the step portion 135 can be defined accurately, and thus high accuracy of the assembly can be achieved easily. Furthermore, an adjustment washer 160 may be provided between the link member 10 and the first end 110A of the body 110 in order to further compensate the manufacturing error and/or the assembling error.

In order to reliably lock the bolt member 120, a lock plate 170 is provided between the bolt head 123 of the bolt member 120 and the end face of the sleeve 130, and the bolt head 123 is locked relative to the sleeve 130 via the lock plate 170. Specifically, the lock plate 170 may be locked to the sleeve 130 via a first lock mechanism, and the bolt head 123 may be locked to the lock plate 170 via a second lock mechanism. For example, as shown in FIG. 12, the first lock mechanism may include a protrusion 178/recess provided on the lock plate 170 and a recess 138/protrusion accordingly provided on the sleeve 130, while the second lock mechanism may include a first lock hole 125 provided on the bolt head 123, a second lock hole 172 provided on the lock plate 170 and a wire member 173 passing through the first lock hole 125 and the second lock hole 172. Those skilled in the art should understand that the first and second lock mechanisms may adopt the other configuration to achieve the same effect.

Figure 9:
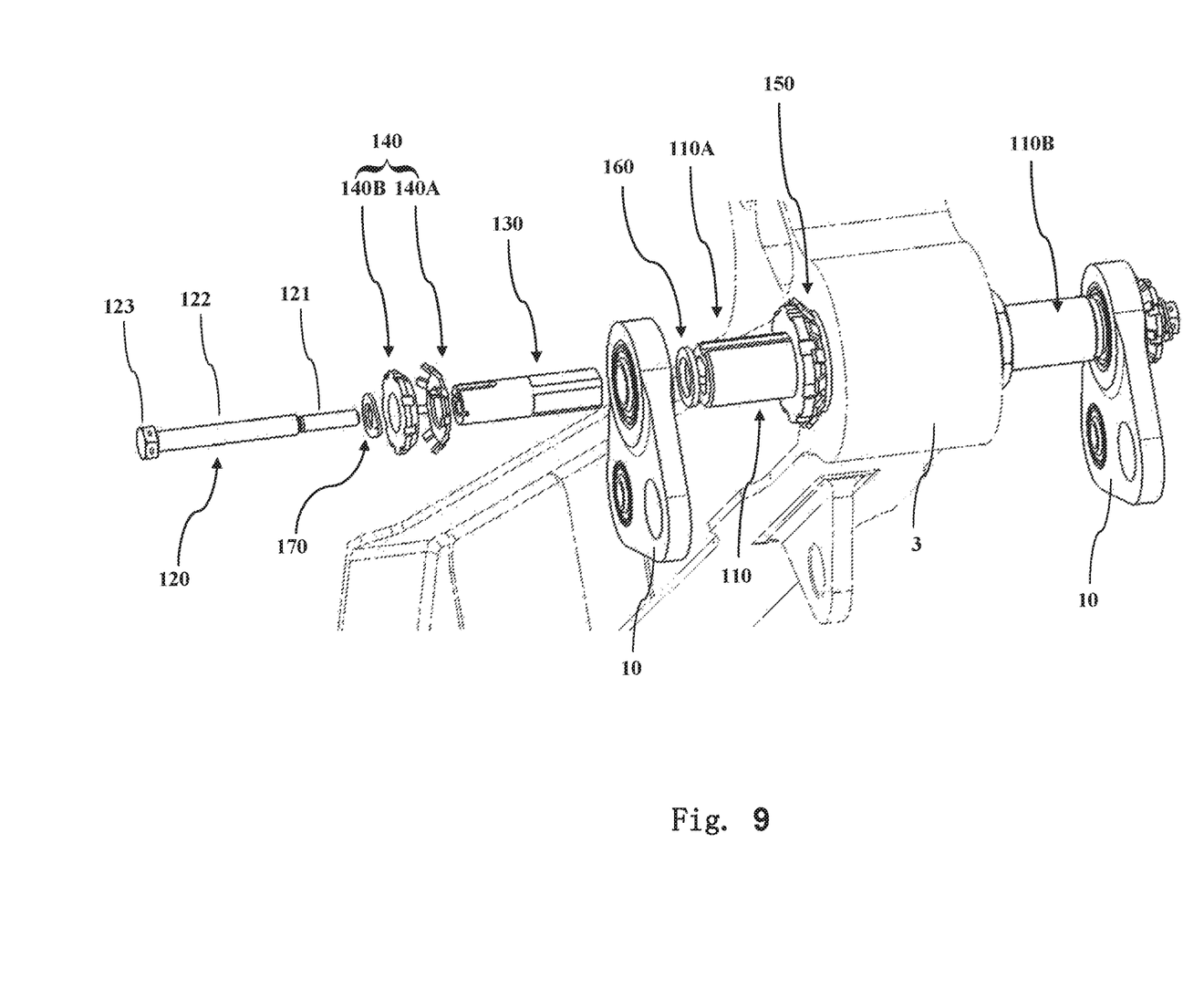
FIG. 9 is an exploded view of the link member of the spoiler and the bending-sustaining joint according to an embodiment of the present invention.
Figure 10:
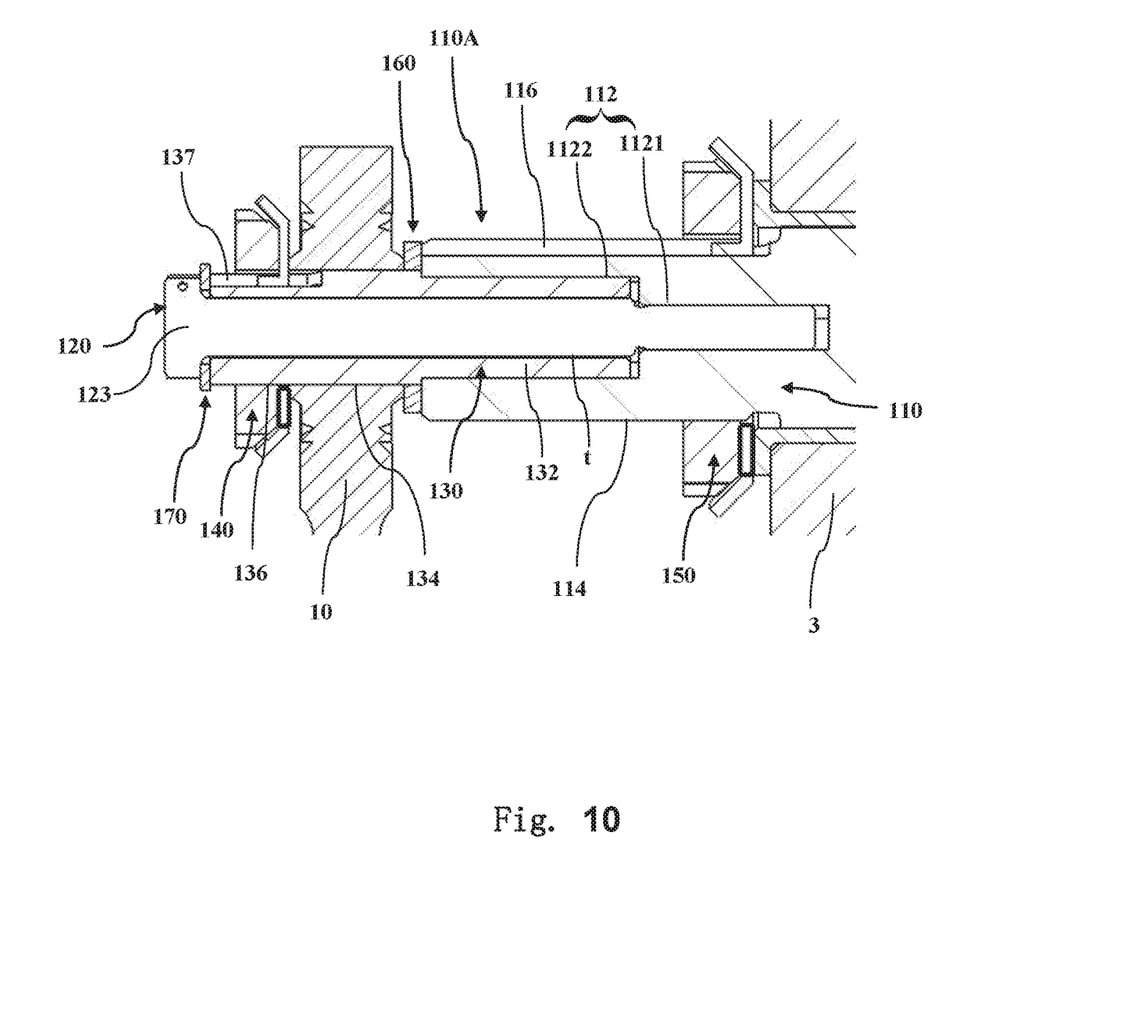
FIG. 10 is a partially enlarged view of FIG. 8.

The assembling process of the link member 10 of the spoilers by the bending-sustaining joint 100 according to the embodiment of the present invention will be described below with reference to FIGS. 8-9. In the first step, the body 110 is inserted into the through hole 3a of the support structure 3 and is secured in position by the fastening assembly 150. In the second step, the connection hole 12 in the link member 10 is substantially aligned with the first bore 112 of the first end of the body 110. In the third step, the sleeve 130 is inserted the connection hole 12 of the link member 10 and fit in the non-threaded portion 1122 of the first bore 112 of the body 110. Also in the third step, the adjustment washer 160 may be placed between the link member 10 and the body 110 if necessary. In the fourth step, in the case that the fastening assembly 140 is fit on the external thread portion 136 of the sleeve 130, the bolt member 120 is inserted through the central hole 171 of the lock plate 170 and the through hole 131 of the sleeve 130, and is screwed into the internal thread portion 1121 of the first bore 112 of the body 110 to achieve the predetermined fastening force. Also in the fourth step, the protrusion 178/recess of the lock plate 170 can be fit into/onto the recess 138/protrusion of the sleeve 130. In the fifth step, the bolt head 123 and the lock plate 170 are locked by the wire member 173 and the fastening assembly 140 is secured in position. At the same time of the above first step to the fifth step, or after the fifth step, the link member 10 at the other side may be assembled by means of the sleeve 130', the bolt member 120' and the fastening assembly 140' and so on.

Although the configuration in which two link member 10 is borne on both sides of the bending-sustaining joint 100 is described above, those skilled in the art should understand that the bending-sustaining joint 100 of the present invention can be used to bear the link member 10 at only one side thereof. In the later case, the configuration at the second end 110B of the bending-sustaining joint 100 can be omitted.

While various embodiments of the present invention have been described in detail herein, it should be understood that the present invention is not limited to the specific embodiments described in detail and illustrated herein, and those skilled in the art can also make other variants and modifications without departing from the principle and scope of the invention, and these variants and modifications should also be deemed to fall into the protective scope of the invention. Furthermore, all the elements described herein can be replaced by other technically equivalent elements.

What is claimed is:

1. A bending-sustaining joint, comprising
    a body for attaching to a support structure, the body having a first end with a first bore including an internal thread portion and a non-threaded portion;
    a sleeve including a fitting portion which can be fit into the non-threaded portion of the first bore, a bearing portion for bearing a borne member and a through hole;
    wherein the joint further comprises a bolt member including a thread section and a bolt head which can abut an end face of the sleeve, the thread section of the bolt member being capable of passing through the through hole of the sleeve and being screwed into the internal thread portion of the first bore so as to secure the sleeve to the body; and,
    wherein the support structure is a bracket formed in a wing of an aircraft, and the borne member is a link member for attaching to a control airfoil of the aircraft.

2. The bending-sustaining joint according to claim 1, wherein the sleeve further comprises an external thread portion, and
    the bending-sustaining joint further comprises a fastening assembly for fitting on the external thread portion of the sleeve so as to hold the borne member between the fastening assembly and an end face of the first end of the body.

3. The bending-sustaining joint according to claim 2, wherein the fastening assembly comprises a lock nut and a lock washer.

4. The bending-sustaining joint according to claim 3, wherein the lock washer comprise a first tab which can be fit in a groove formed on an outer circumference of the sleeve and a second tab which can be fit in a groove formed on an outer circumference of the lock nut.

5. The bending-sustaining joint according to claim 2, wherein the body has a second end with a second bore, the second bore has the symmetrical configuration as that of the first bore, and
    the second end of the body is provided with a second sleeve, a second bolt member and a second fastening assembly which have the same configuration as that of the sleeve, the bolt member and the fastening assembly, respectively.

6. The bending-sustaining joint according to claim 1, wherein the fitting portion of the sleeve is positively fit into the non-threaded portion of the first bore of the body.

7. The bending-sustaining joint according to claim 6, wherein the fitting portion of the sleeve has a flat portion, the non-threaded portion of the first bore of the body has a matched flat portion.

8. The bending-sustaining joint according to claim 7, wherein the flat portion of the fitting portion of the sleeve is substantially perpendicular to a radial component of a load applied on the bearing portion of the sleeve by the borne member.

9. The bending-sustaining joint according to claim 1, wherein there is a predetermined radial gap (t) between the sleeve and the bolt member.

10. The bending-sustaining joint according to claim 1, wherein the sleeve comprises a step portion for abutting against an end face of the first end of the body.

11. The bending-sustaining joint according to claim 1, wherein the control airfoil comprises a flap, a slat or a spoiler.

12. An aircraft comprising a bending-sustaining joint according to claim 1.

13. A bending-sustaining joint, comprising:
a body for attaching to a support structure, the body having a first end with a first bore including an internal thread portion and a non-threaded portion;
a sleeve including a fitting portion which can be fit into the non-threaded portion of the first bore, a bearing portion for bearing a borne member and a through hole;
wherein the joint further comprises a bolt member including a thread section and a bolt head which can abut an end face of the sleeve, the thread section of the bolt member being capable of passing through the through hole of the sleeve and being screwed into the internal thread portion of the first bore so as to secure the sleeve to the body;
wherein the sleeve further comprises an external thread portion;
the bending-sustaining joint further comprises a fastening assembly for fitting on the external thread portion of the sleeve so as to hold the borne member between the fastening assembly and an end face of the first end of the body; and
wherein an adjustment washer is provided between the borne member and the first end of the body.

14. A bending-sustaining joint, comprising:
a body for attaching to a support structure, the body having a first end with a first bore including an internal thread portion and a non-threaded portion;
a sleeve including a fitting portion which can be fit into the non-threaded portion of the first bore, a bearing portion for bearing a borne member and a through hole;
wherein the joint further comprises a bolt member including a thread section and a bolt head which can abut an end face of the sleeve, the thread section of the bolt member being capable of passing through the through hole of the sleeve and being screwed into the internal thread portion of the first bore so as to secure the sleeve to the body; and
wherein a lock plate is provided between the bolt head of the bolt member and the end face of the sleeve, and the bolt head is locked relative to the sleeve via the lock plate.

15. The bending-sustaining joint according to claim 14, wherein the lock plate is locked to the sleeve via a first lock mechanism, the bolt head is locked to the lock plate via a second lock mechanism.

16. The bending-sustaining joint according to claim 15, wherein the first lock mechanism comprises a protrusion/recess provided on the lock plate and a recess/protrusion accordingly provided on the sleeve.

17. The bending-sustaining joint according to claim 15, wherein the second lock mechanism comprises a first lock hole provided on the bolt head, a second lock hole provided on the lock plate and a wire member passing through the first lock hole and the second lock hole.

18. A bending-sustaining joint, comprising:
a body for attaching to a support structure, the body having a first end with a first bore including an internal thread portion and a non-threaded portion;
a sleeve including a fitting portion which can be fit into the non-threaded portion of the first bore, a bearing portion for bearing a borne member and a through hole;
wherein the joint further comprises a bolt member including a thread section and a bolt head which can abut an end face of the sleeve, the thread section of the bolt member being capable of passing through the through hole of the sleeve and being screwed into the internal thread portion of the first bore so as to secure the sleeve to the body; and
wherein the body is attached to the support structure by one of the following manner that:
i) a flange member integrally formed on the body abuts against a first side of the support structure, and a fastening assembly fit on an external thread portion on an outer circumference of the body abuts against a second side of the support structure; and
ii) two fastening assembly fit on an external thread portion on an outer circumference of the body abut against a first side and a second side of the support structure, respectively.

* * * * *